United States Patent
Jacobsen et al.

(10) Patent No.: US 7,017,687 B1
(45) Date of Patent: Mar. 28, 2006

(54) RECONFIGURABLE ARTICULATED LEG AND WHEEL

(75) Inventors: Stephen Jacobsen, Salt Lake City, UT (US); Fraser M. Smith, Salt Lake City, UT (US); Marc Olivier, Sandy, UT (US); Christopher S. Maggio, Salt Lake City, UT (US)

(73) Assignee: Sarcos Investments LC, Salt Lake City, UT (US)

( * ) Notice: Subject to any disclaimer, the term of this patent is extended or adjusted under 35 U.S.C. 154(b) by 79 days.

(21) Appl. No.: 10/720,011

(22) Filed: Nov. 21, 2003

Related U.S. Application Data

(60) Provisional application No. 60/428,512, filed on Nov. 21, 2002.

(51) Int. Cl.
*B62D 57/02* (2006.01)

(52) U.S. Cl. .............................. 180/8.3; 280/5.2; 901/1

(58) Field of Classification Search ................. 180/7.1, 180/8.1–8.7; 280/5.2, 5.26; 901/1; 305/5.1, 305/60

See application file for complete search history.

(56) References Cited

U.S. PATENT DOCUMENTS

| | | | |
|---|---|---|---|
| 792,403 A | 6/1905 | Crosse | |
| 1,664,570 A | 4/1928 | Perilli | |
| 1,670,100 A | 5/1928 | Deitrich | |
| 2,941,846 A | 6/1960 | Hall et al. | |
| 3,179,431 A | 4/1965 | Pikl | |
| 4,241,803 A * | 12/1980 | Lauber | 180/8.1 |
| 4,265,326 A | 5/1981 | Lauber | |
| 4,558,758 A * | 12/1985 | Littman et al. | 180/8.3 |
| 4,648,853 A * | 3/1987 | Siegfried | 446/448 |
| 5,137,101 A * | 8/1992 | Schaeff | 180/8.1 |
| 5,361,186 A | 11/1994 | Tanie et al. | |
| 5,609,216 A | 3/1997 | Fisher et al. | |
| 6,068,073 A | 5/2000 | Roston et al. | |
| 6,082,475 A | 7/2000 | Iikhanov | |
| 6,397,960 B1 | 6/2002 | Alber | |
| 2002/0104692 A1 | 8/2002 | Nakatsukasa et al. | |

FOREIGN PATENT DOCUMENTS

JP           58167263 A * 10/1963 ................. 180/7.1

\* cited by examiner

*Primary Examiner*—Lesley D. Morris
*Assistant Examiner*—L. Lum
(74) *Attorney, Agent, or Firm*—Thorpe North & Western

(57) ABSTRACT

A reconfigurable leg and wheel device includes an array of components joined in series configurable as i) an articulated leg with the components movable with respect to one another in a walking motion, and reconfigurable as ii) a wheel with the components forming a circular outer surface and being rotatable about an axis in a rotational motion.

19 Claims, 9 Drawing Sheets

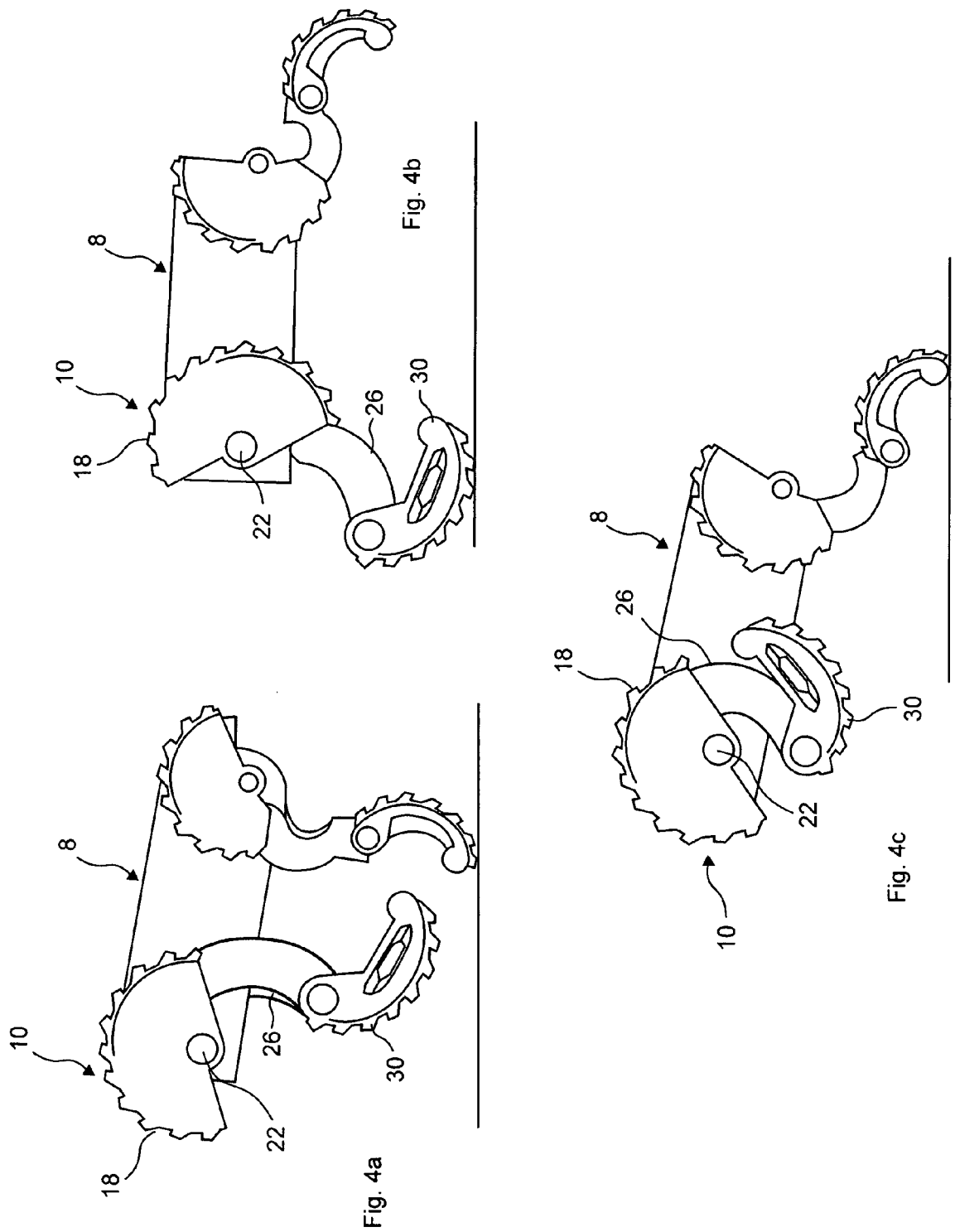

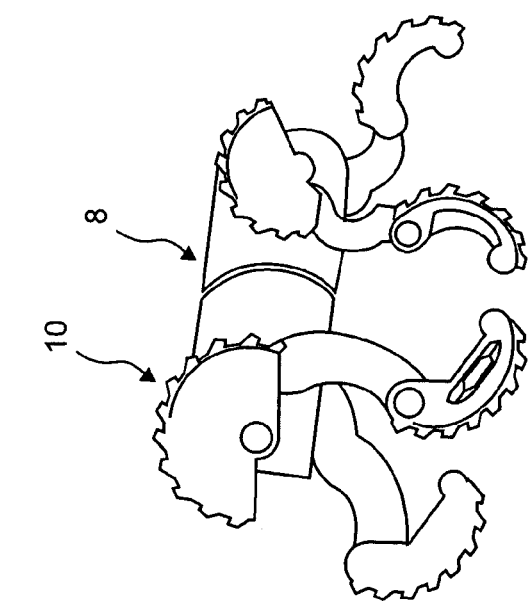
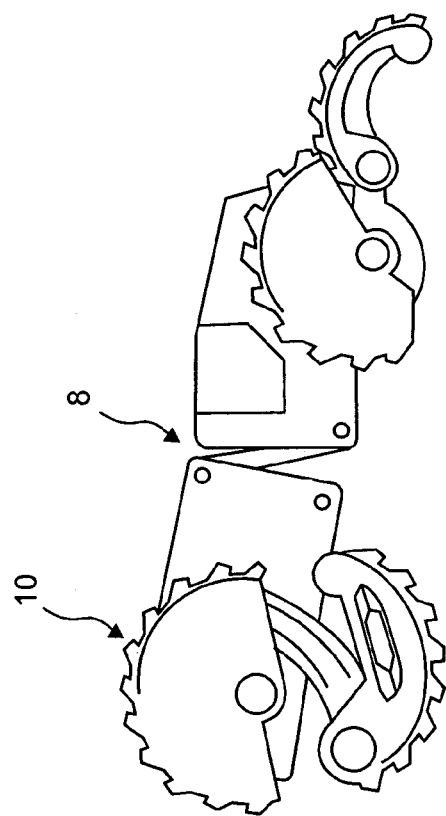
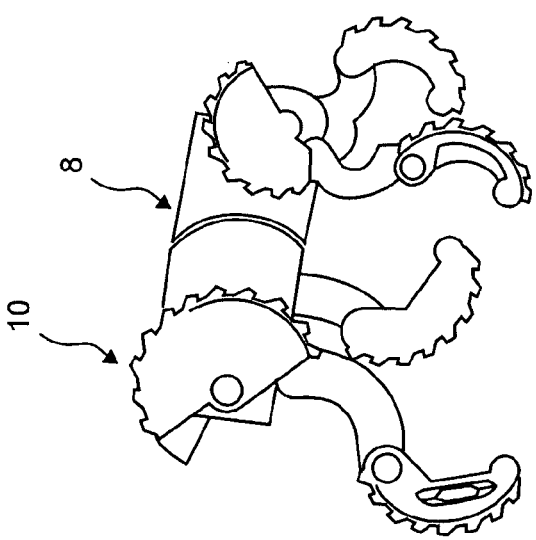
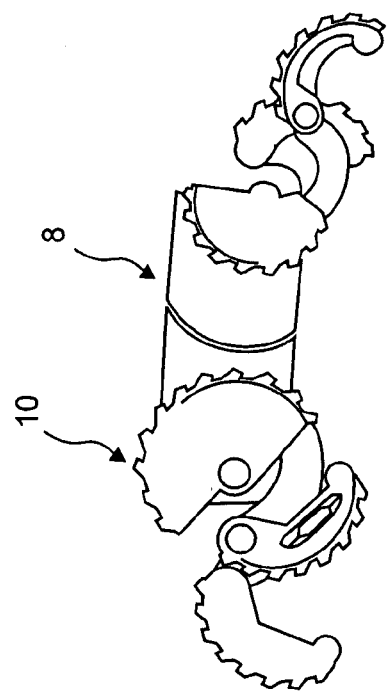
Fig. 5a
Fig. 5b
Fig. 5c
Fig. 5d

US 7,017,687 B1

RECONFIGURABLE ARTICULATED LEG AND WHEEL

This application claims the benefit of U.S. Provisional Patent Application No. 60/428,512, filed Nov. 21, 2002.

BACKGROUND OF THE INVENTION

1. Field of the Invention

The present invention relates generally to robotics. More particularly, the present invention relates to an articulated leg that is configurable as a wheel.

2. Related Art

Improvement of robotics and/or robotic movement is a continuing pursuit. Wheeled transportation can be characterized by greater efficiency or speed, while articulated leg transportation can be characterized by greater flexibility for movement over complex terrain. Wheels can rotate quickly, but can have difficulty on uneven terrain, while articulated legs can negotiate the uneven terrain, but can have difficulty with speed. Such wheeled transport can have limited mobility and behavior due to complex environment and lack of adaptability to unpredictable terrain.

SUMMARY OF THE INVENTION

It has been recognized that it would be advantageous to develop a robot or a robotic transportation system capable of greater mobility, efficiency, and adaptability. In addition, it has been recognized that it would be advantageous to develop legs and/or wheels to facilitate mobility of vehicles or robots.

The invention provides a reconfigurable leg and wheel device with an array of components joined in series configurable as i) an articulated leg with the components movable with respect to one another in a walking motion, and reconfigurable as ii) a wheel with the components forming a circular outer surface and being rotatable about an axis in a rotational motion.

In accordance with a more detailed aspect of the present invention, the array of components can include a plurality of semi-circular segments combinable to form a substantially continuous circular surface to make rolling contact with a support surface.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 2b is a perspective view of the vehicle of FIG. 2a;

FIGS. 4a–c are side views of the vehicle of FIG. 2a shown in a bounding configuration;

FIGS. 5a and b are side views of the vehicle of FIG. 2a shown in a walking configuration;

FIG. 5c is a side view of the vehicle of FIG. 2a shown in a crawling configuration;

DETAILED DESCRIPTION

Figure 1A:
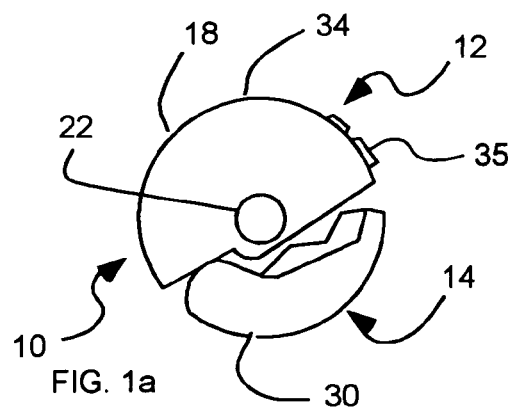
FIGS. 1a–e are side views of a is a perspective view of a reconfigurable articulated leg and wheel in accordance with an embodiment of the present invention with FIG. 1a showing a wheel configuration and FIGS. 1b–e showing other configurations.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIGS. 1a–5c, a reconfigurable articulated leg and wheel (leg/wheel), indicated generally at 10, in accordance with the present invention is shown for providing both walking and rolling motions or modes of transportation. The leg/wheel 10 can morph, transform, convert, or be reconfigured between leg and wheel configurations, or between a leg and a wheel, indicated respectively at 11 and 12. A plurality of the legs/wheels 10 can be provided on a single vehicle, body or robot, indicated generally at 8. For example, four legs/wheels 10 can be provided, as shown. Vehicles and robotics are examples of fields that can benefit from the use of such a leg/wheel 10. The legs/wheels 10 can provide the robot 8 with mobility both quickly on flat surfaces, and efficiently on irregular surfaces. Such robots can be used in various different applications, including for example, military reconnaissance, biohazard, bomb analysis, etc.

The leg/wheel 10 can include an array of components or plurality of leg segments 14 joined in series. The leg segments 14 can be coupled end-to-end, with the ends of adjacent leg segments pivotally coupled together. The array of components or plurality of leg segments 14 can include 1) an upper leg 18 pivotally coupled at an axis 22 to the body, vehicle or robot 8; 2) a lower or intermediate leg 26 pivotally coupled to the upper leg 18; and 3) a foot 30 pivotally coupled to the lower leg 26. The components or leg segments can include at least two leg segments, such as upper leg 18 and foot 30, and at least one intermediate leg segment 26.

The components or leg segments 14 can include a plurality of semi-circular segments or portions 34 that combine to form a continuous circular outer surface or wheel configured 12 to make rolling contact with a support surface, such as the ground. Only some of the leg segments 14 can include the semi-circular portions 34, such as the upper leg 18 and the foot 30, while other leg segments may not include a semi-circular portion, such as intermediate or lower leg 26.

Thus, only some of the leg segments 14 may form the outer periphery or circumference of the wheel 12. Alternatively, each leg segment 14 can include a semi-circular portion 34.

The components or leg segments 14 can have various different lengths, and can form various different portions of the wheel 12. The upper leg 18 can be sized, or can have a length, that forms a greater portion of the wheel. For example, the upper leg can form approximately ⅓ to ½ of the wheel. The intermediate or lower leg can form less than ⅓ than the wheel. The foot 30 can form less than ⅓ or ¼ of the wheel. The semi-circular segments or portions 34 can include a tread 35 (FIG. 1a) or the like. In addition, portions of the leg segments 14 can fold into other or adjacent leg segments during use or in the wheel configuration 12. For example, the intermediate or lower leg 26 can fold substantially into the upper leg 18 and foot 30.

Figure 1B:
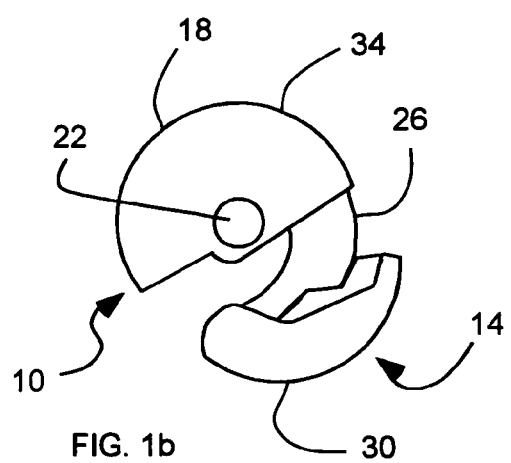
Figure 1D:
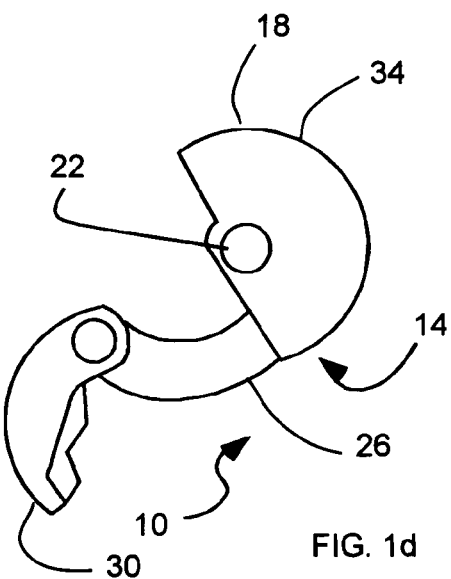

The components or leg segments 14 can be configurable as 1) an articulated leg 11 with the components movable with respect to one another in a walking motion (FIG. 1c); and reconfigurable as 2) a wheel 12 with the components forming a circular outer surface and being rotatable about an axis in a rotational motion (FIG. 1b). The components or leg segments 14 including at least two configurations, including a leg configuration 11 (FIG. 1c) and a wheel configuration 12 (FIG. 1a). In the leg configuration 11, the leg segments 14 can be movable with respect to one another. The various leg segments 14 can pivot with respect to one another or adjacent segments in a walking motion, or the like. The leg configuration 11 can facilitate movement over rough or uneven terrain. In the wheel configuration 12, the leg segments 14 can be rigidly affixed with respect to one another with the semi-circular portions 34 combined to form a substantial circular outer surface, and rotatable about an axis in a rotational motion. The wheel 12 can rotate about the axis or axle 22. The wheel configuration 12 can allow the vehicle or robot 8 to move rapidly over smoother terrain.

Figure 1C:
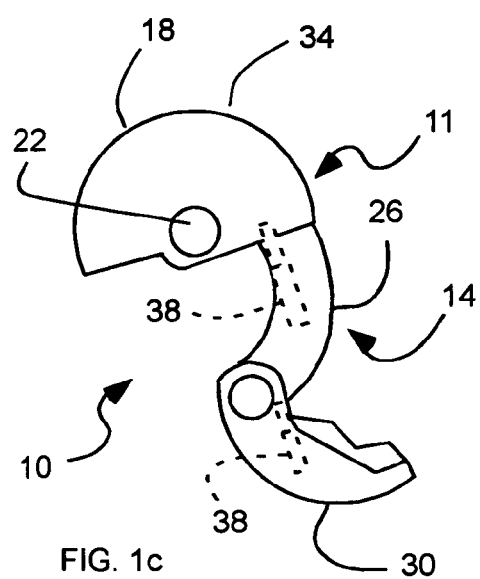
Figure 1E:
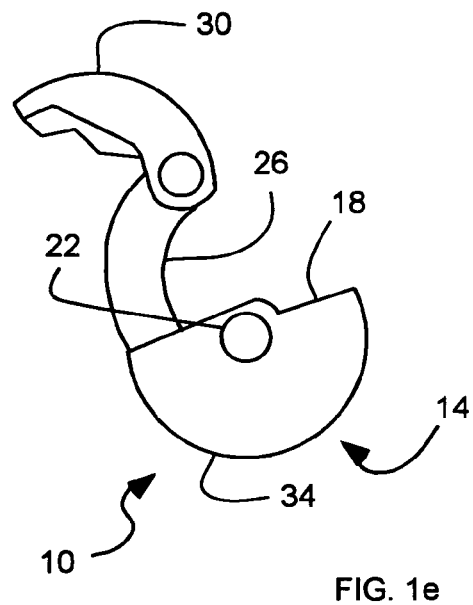

Referring to FIGS. 1a–e, the leg/wheel 10 is shown transforming or morphing between the wheel 12 or wheel configuration (FIG. 1a) to various other configurations, including the leg 11 or leg configuration (FIG. 1c). The leg can also be configured to reach or extend, such as in FIG. 1e.

Figure 2A:
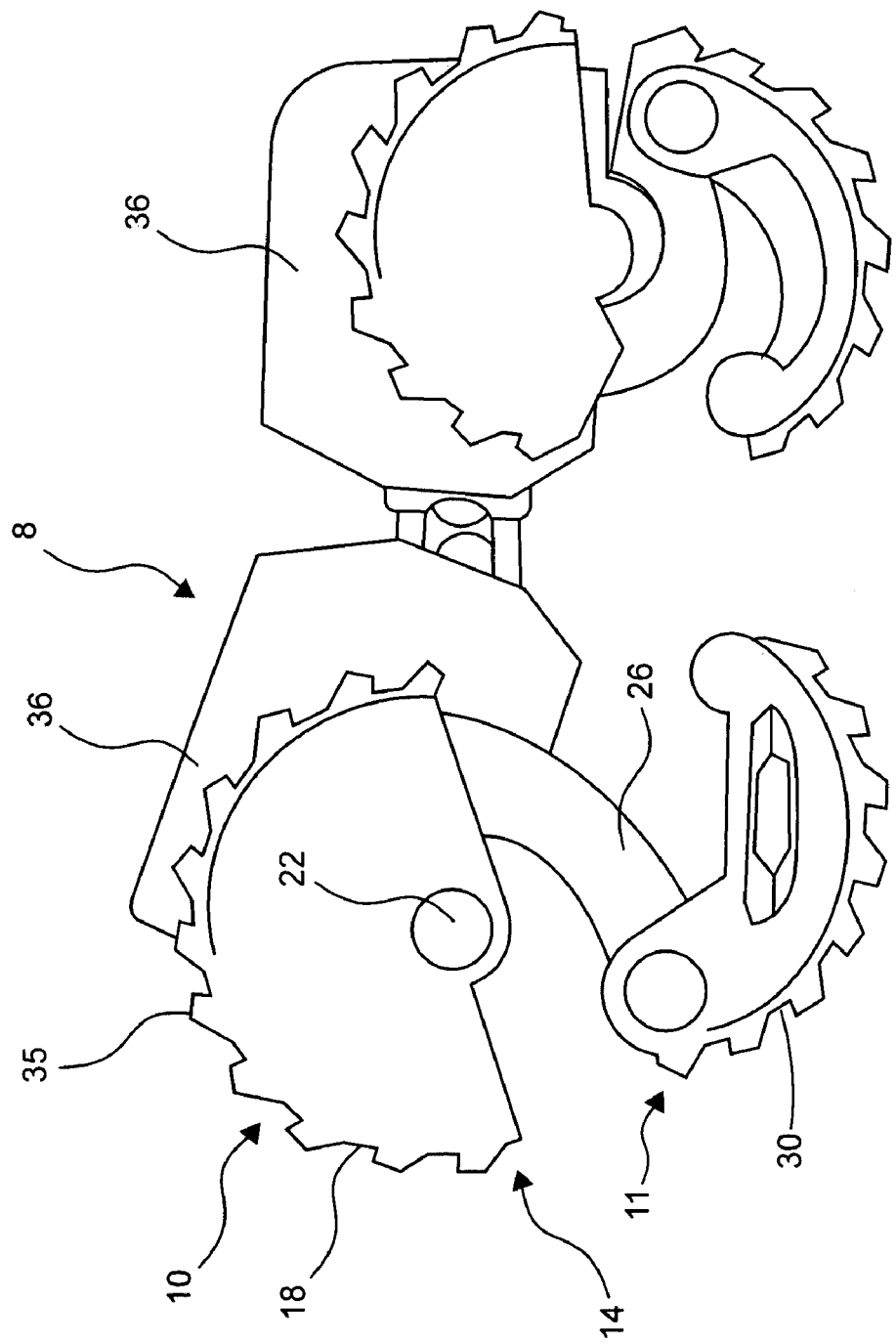
FIG. 2a is a side view of a vehicle with the reconfigurable articulated leg and wheel of FIGS. 1a–e.
Figure 2B:
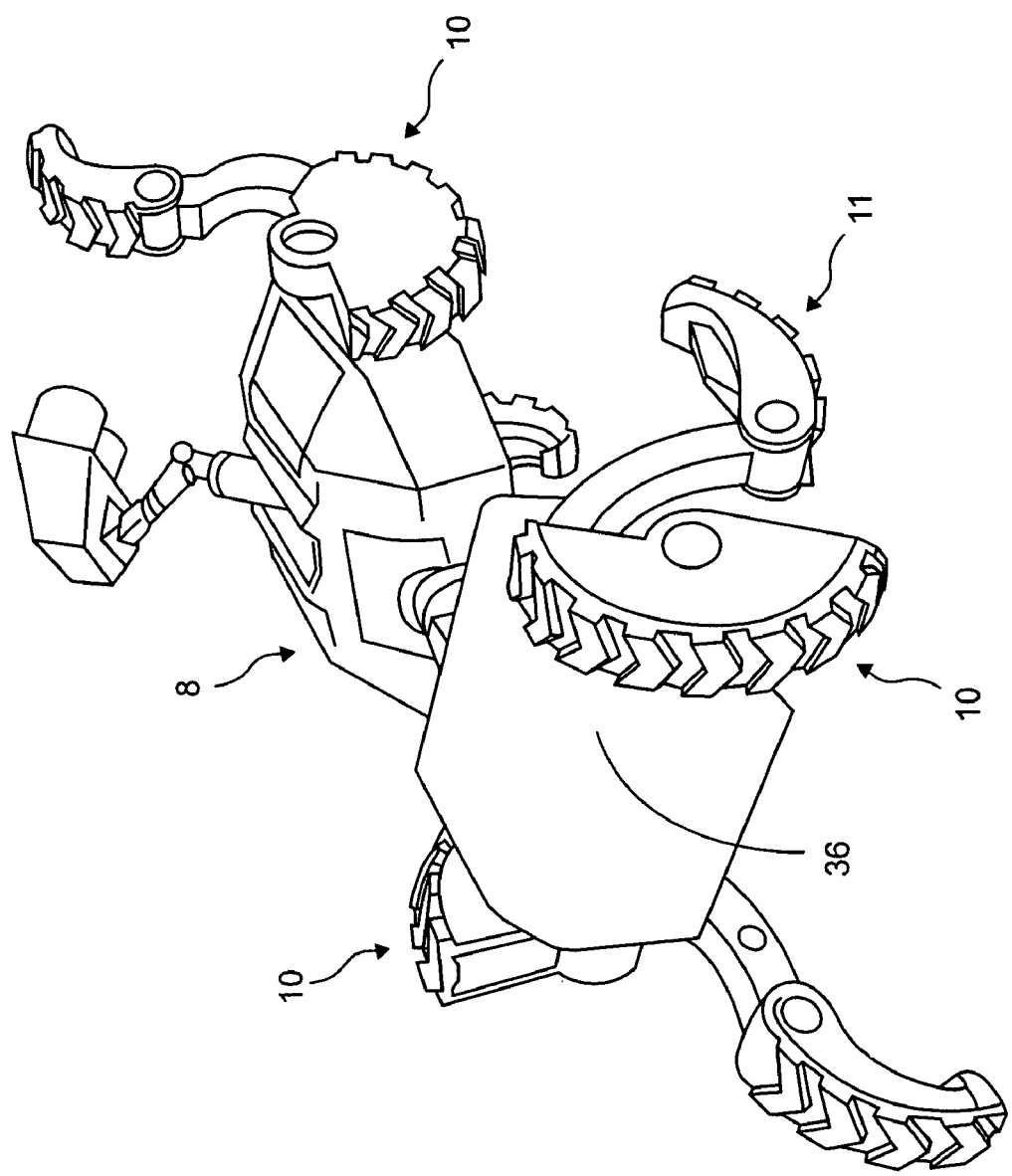
Figure 3D:
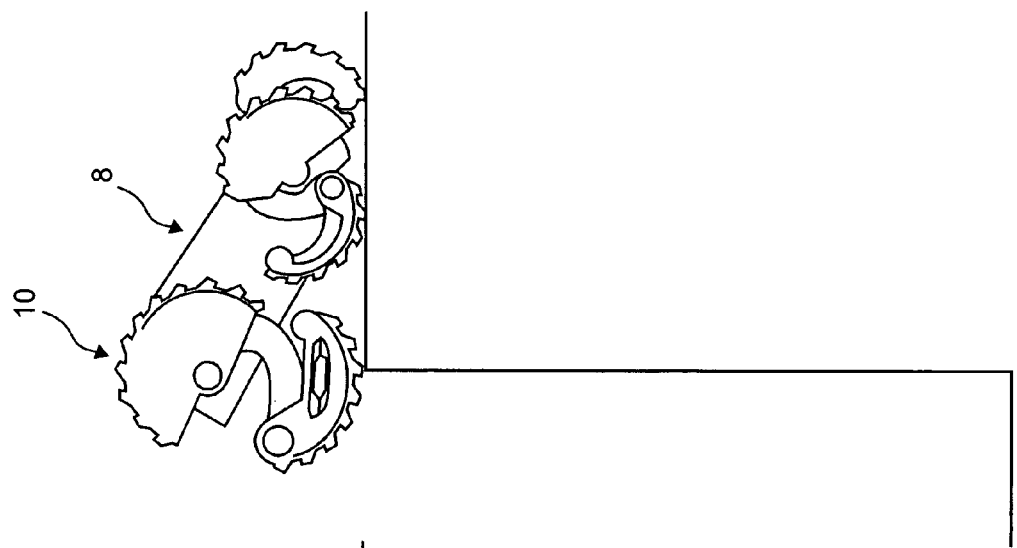
FIGS. 3a–d are side views of the vehicle of FIG. 2a shown in a climbing configuration.
Figure 3C:
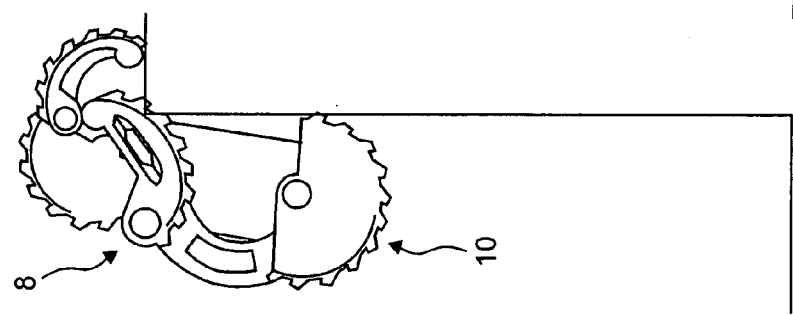
Figure 3B:
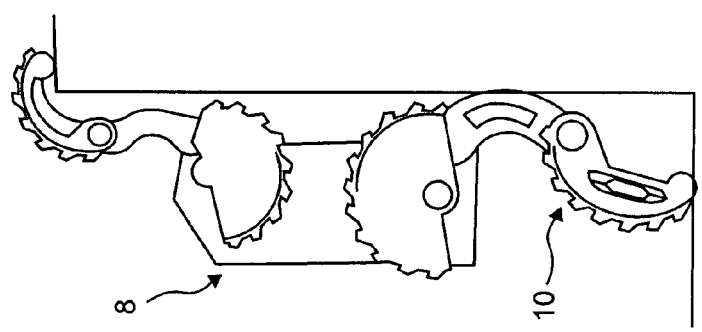
Figure 3A:
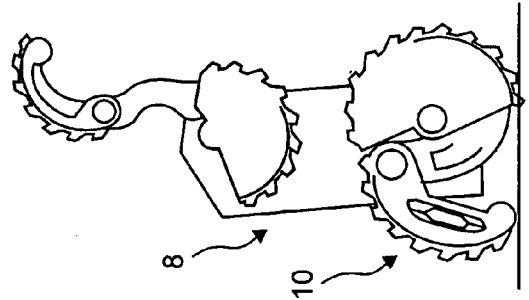

Referring to FIGS. 2a and 2b, the vehicle or robot 8 can include a plurality of such legs/wheels 10, such as four. For example, the vehicle or robot 8 can have a pair of rear legs/wheels and a pair of front legs/wheels. The rear legs/wheels can be configured so that the intermediate leg 26 extends from a front of the upper leg 18 to a rear of the foot 30. The front legs/wheels can be configured so that the intermediate leg 26 extends from a rear of the upper leg 18 to a front of the foot 30.

The vehicle or robot 8 can have front and rear portions that are pivotally coupled to one another. The front and rear portions can be pivoted with respect to one another to turn the vehicle or robot. The vehicle or robot can include one or more power units or motors 36 that can be operatively coupled to the legs/wheels 10. The power units or motors can rotate the wheels 12. In addition, the power units or motors can pivot the upper legs 18.

In addition, the legs/wheels 10 can include actuators 38 (FIG. 1c) coupled to the components or leg segments 14 to move the components or leg segments with respect to each other in the leg configuration, and to reconfigure the components as the wheel 12. The actuators can be of any known type, including for example, hydraulic cylinders, etc. The robot or body also can include a power source to power the actuators, and/or propel the wheels. The power source can be of any known type. For example, the power and actuator systems can include a hydraulic motor and hydraulic actuators.

Referring to FIGS. 3a–d, the vehicle or robot 8 is shown in a climbing mode or configuration. The movement of the various legs/wheels 10 can be coordinated to lift and pull the vehicle or robot 8 up a vertical step.

Referring to FIGS. 4a–c, the vehicle or robot 8 is shown in a bounding mode or configuration. Again, the movement of the various legs/wheels 10 can be coordinated so that the vehicle or robot bounds. The bounding movement can mimic human or animal walking motions.

Referring to FIGS. 5a and b, the vehicle or robot 8 is shown in a leg configuration with the legs in a walking movement. In FIG. 5c, the vehicle or robot 8 is shown in a crawling mode or configuration, with the body, vehicle or robot lower to the ground.

Figure 6A:
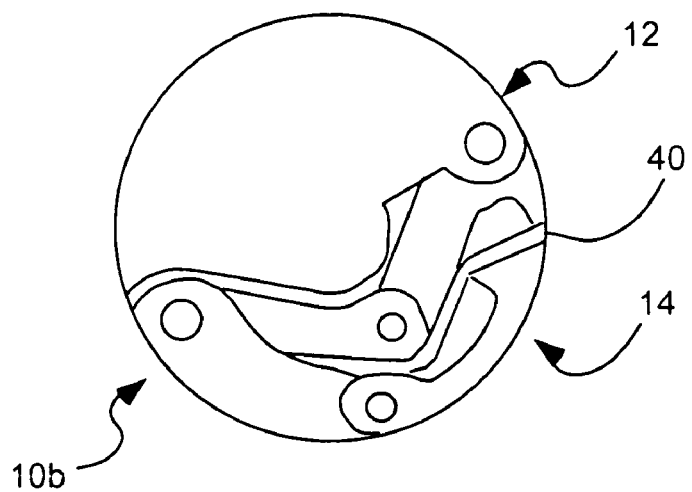
FIGS. 6a and b are side views of a reconfigurable articulated leg and wheel in accordance with an embodiment of the present invention with FIG. 6a showing a wheel configuration and FIG. 6b showing a leg or walking configuration.
Figure 6B:
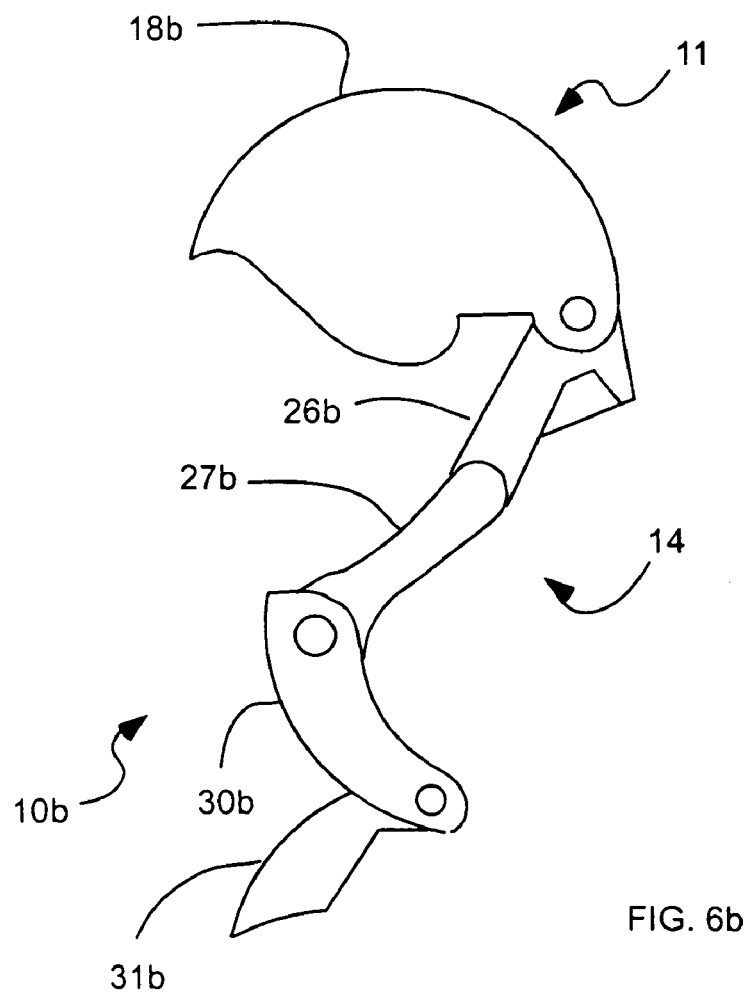

Referring to FIGS. 6a and b, another leg/wheel 10b is shown that is similar in many respects to that described above. The leg/wheel 10b can include a plurality of leg segments 14b, including an upper leg 18b, two intermediate legs 26b and 27b, and two feet 30b and 31b. Additional leg segments can provide for additional and more sophisticated movements and configurations.

Figure 7A:
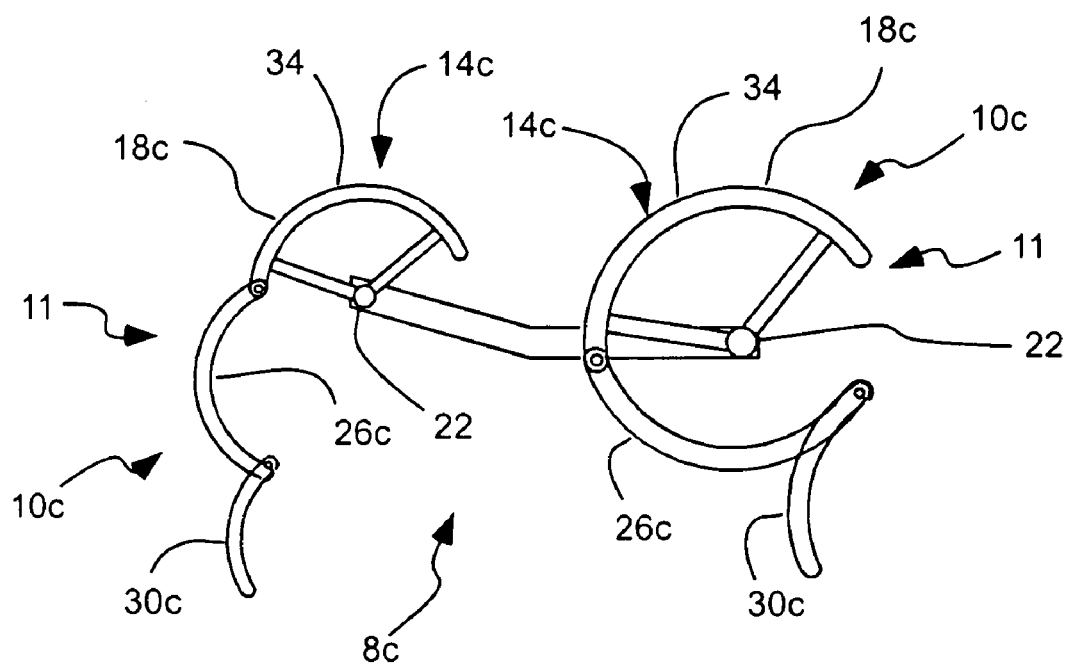
FIGS. 7a and b are schematic side views of a reconfigurable articulated leg and wheel in accordance with an embodiment of the present invention with FIG. 7a showing a leg or walking configuration and FIG. 7b showing a wheel configuration.
Figure 7B:
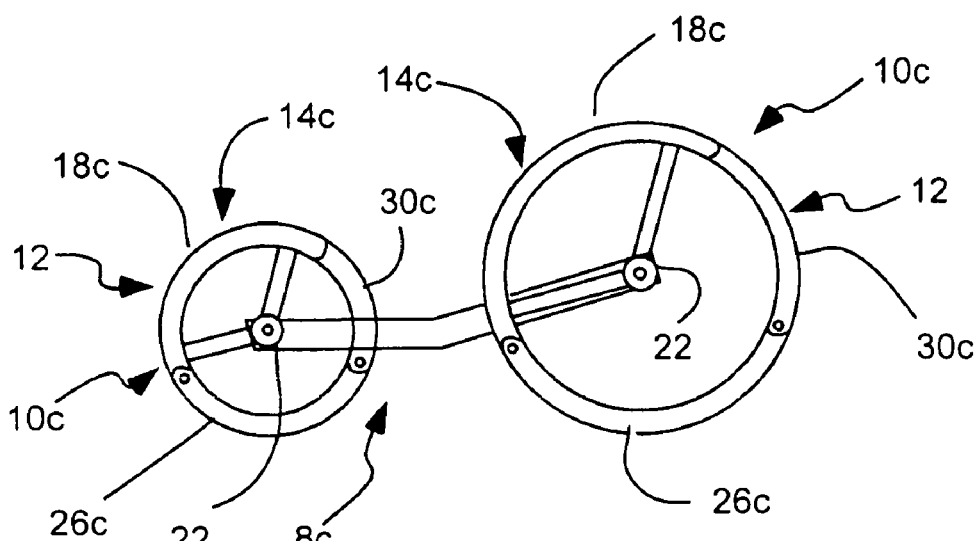

The components or leg segments 14 or 14b can arranged so that at least one of the leg segments, such an intermediate legs 26, 26b and 27b transverse the wheel in the wheel configuration, as shown in FIGS. 1a–6b. The components or leg segments can also be arranged in series in the wheel configuration. Referring to FIGS. 7a and 7b, another leg/wheel 10c and vehicle or robot 8c are shown that are similar in many respects to those described above. The leg/wheel 10c can include a plurality of leg segments 14c that are pivotally coupled together in series, and that extend sequentially around the axis 22 in the wheel configuration (FIG. 7b). For example, the upper leg 18c, intermediate or lower leg 26c, and the foot 30c extend circumferentially around the axis 22 to form the wheel 12.

Figure 8A:
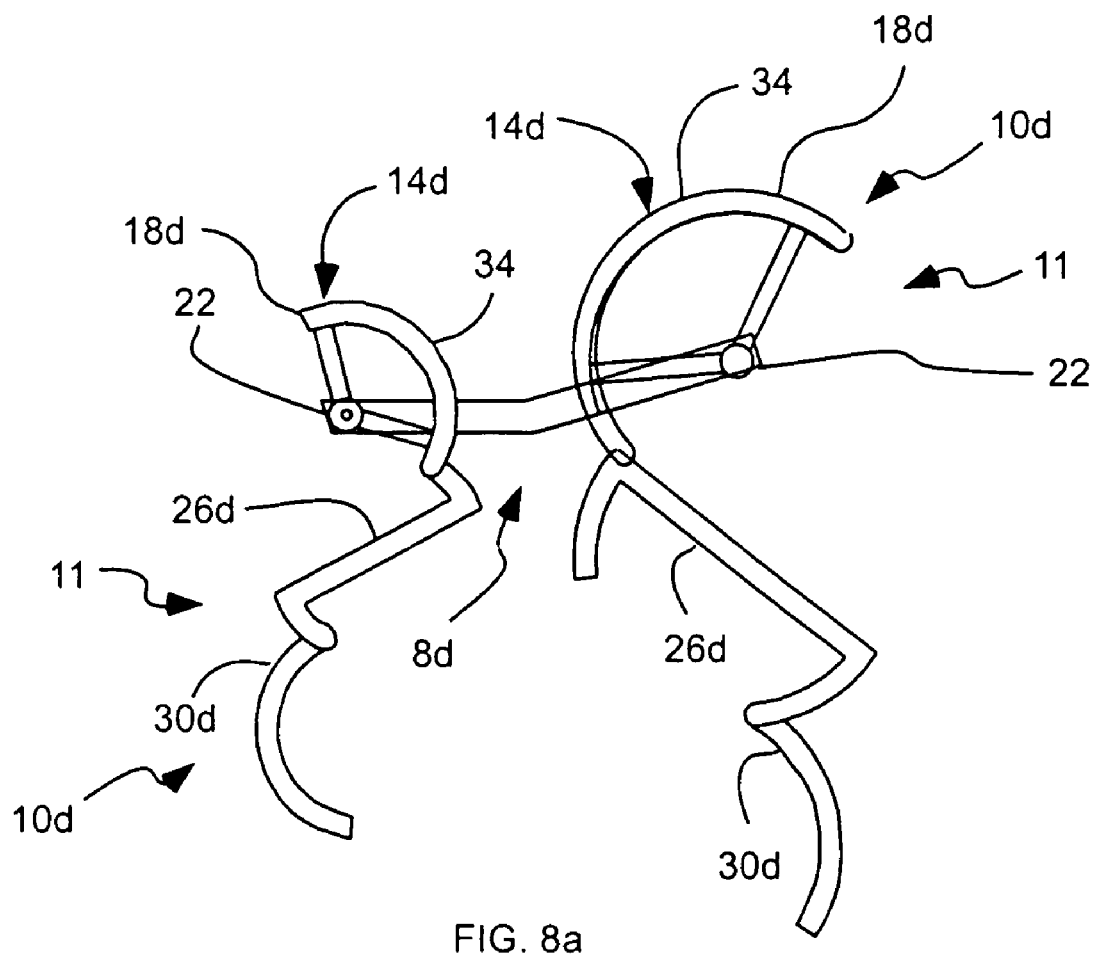
FIGS. 8a and b are schematic side views of a reconfigurable articulated leg and wheel in accordance with an embodiment of the present invention with FIG. 8a showing a leg or walking configuration and FIG. 8b showing a wheel configuration.
Figure 8B:
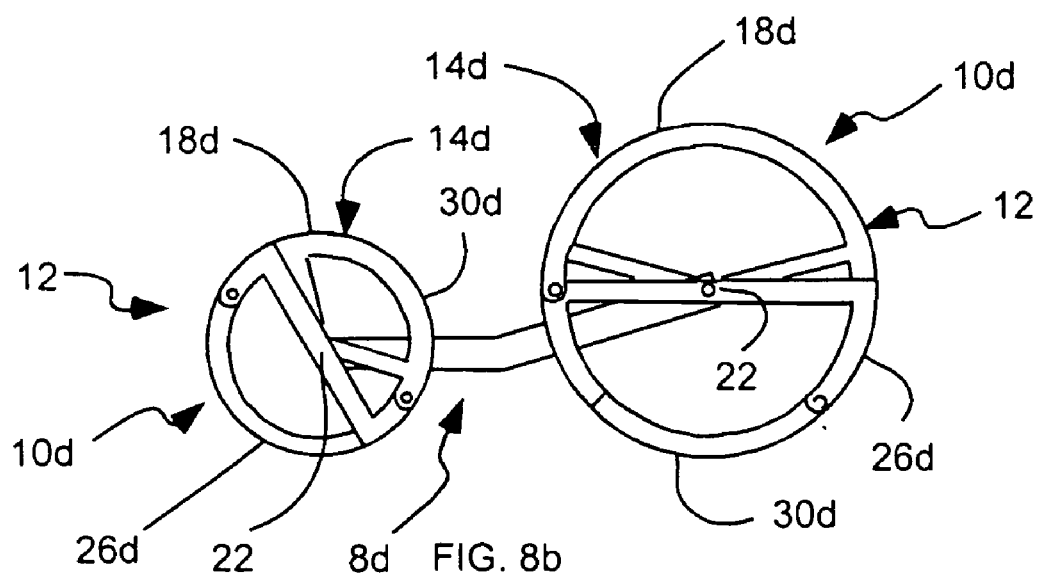

Referring to FIGS. 8a and 8b, another leg/wheel 10d and vehicle or robot 8d are shown that are similar in many respects to those described above. The leg/wheel 10d can include a plurality of leg segments 14d that are pivotally coupled together in series, with the intermediate or lower leg 26d extending transverse to the wheel 12 (FIG. 8b). The leg segments 14d can include the upper leg 18d, intermediate or lower leg 26d, and the foot 30d. The intermediate leg 26d can include at least a portion of the semi-circular portion 34, and can form part of the wheel 12.

The robot can be configured to provide various different functions, including surveillance, search and rescue, surface data, logistics support, detective, etc. Thus, the robot can include various different mechanisms, including cameras, sensors, robotic arms and/or grips, etc. The robot can include various communications equipment, such as receiver/transmitter to send and receive data and/or instructions. The robot also can include a global position system (GPS) to facilitate positioning. The robot also can include a controller, control circuitry, or computer to control and operate the robot, mechanisms, etc. The robot also can be configured to carry items, such as batteries, fuel, food/water, medical supplies, etc.

The legs/wheels 10 and the robot can be configured to perform various different movements, including crawl or caterpillar action, drop and roll, jump, flip, climb, walking, rolling, trotting, galloping, bounding, pronging, standing, balancing, sitting, stumble and fall recovery, etc.

The legs/wheels can be configures so that substantially all of the components 14 fit within a circumference defined by the wheel 12.

The legs/wheels also can include retractable traction elements, such as claws. Such elements can be deployed from the legs or wheels.

A circular cap 40 (FIG. 6a) can be disposed over the components when reconfigured as the wheel. The cap can protect the components.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A reconfigurable leg and wheel device, comprising:
    an array of components joined in series configurable as i) an articulated leg with an upper leg pivotally coupled at an axis to a body, a lower leg pivotally coupled to the upper leg, and a foot pivotally coupled to the lower leg, the upper leg, the lower leg and the foot movable with respect to one another in a walking motion, and reconfigurable as ii) a wheel with the upper leg, the lower leg and the foot forming a circular outer surface and being rotatable about an axis in a rotational motion.

2. A device in accordance with claim 1, wherein the array of components further includes:
    a plurality of semi-circular segments combinable to form a substantially continuous circular surface configured to make rolling contact with a support surface.

3. A device in accordance with claim 1, wherein the array of components includes:
    a) at least two leg segments having semi-circular portions; and
    b) at least one intermediate leg segment interconnecting the at least two leg segments.

4. A device in accordance with claim 1, further comprising:
    at least one actuator, coupled between at least two of the components, to articulately move the components with respect to each other in the walking motion, and to reconfigure the components as the wheel.

5. A device in accordance with claim 1, further comprising:
    a circular cap, disposable over the components when reconfigured as the wheel.

6. A device in accordance with claim 1, wherein one of the components is coupled to the axis and remaining components extend sequentially around the axis when reconfigured as the wheel.

7. A device in accordance with claim 1, wherein at least one of the components extends transversely to the wheel when the components are reconfigured as the wheel.

8. A combined and transformable wheel and leg device, comprising:
    a) a plurality of leg segments pivotally joined in series;
    b) the leg segments including at least two leg segments having semi-circular portions;
    c) at least one intermediate leg segment interconnecting the at least two leg segments; and
    c) the leg segments defining at least two configurations, including:
        i) a leg configuration in which the leg segments are movable with respect to one another; and
        ii) a wheel configuration in which the leg segments are rigidly affixed with respect to one another, and the semi-circular portions are combined to form a substantial circular outer surface, and being rotatable about an axis in a rotational motion.

9. A device in accordance with claim 8, wherein the plurality of leg segments further includes:
    a) an upper leg pivotally coupled at the axis to a body;
    b) a lower leg pivotally coupled to the upper leg; and
    c) a foot pivotally coupled to the lower leg.

10. A device in accordance with claim 8, further comprising:
    at least one actuator, coupled between at least two leg segments, to move the leg segments with respect to each other in the leg configuration.

11. A device in accordance with claim 8, further comprising:
    a circular cap, disposable over the leg segments in the wheel configuration.

12. A device in accordance with claim 8, wherein one of the leg segments is coupled to the axis and remaining leg segments extend sequentially around an axis in the wheel configuration.

13. A device in accordance with claim 8, wherein at least one of the leg segments extends transversely to one of the other leg segments in the wheel configuration.

14. A combined and transformable wheel and leg device, comprising:
    a) an array of leg segments pivotally joined in series, including at least:
        i) an upper leg pivotally coupled at an axis to a body; and
        ii) a lower leg pivotally coupled to the upper leg;
    b) a plurality of semi-circular portions, associated with at least some of the leg segments;
    c) the leg segments defining at least two configurations, including:
        i) a leg configuration in which the leg segments are movable with respect to one another; and
        ii) a wheel configuration in which the leg segments are rigidly affixed with respect to one another, and the semi-circular portions are combined to form a substantial circular outer surface, and being rotatable about an axis in a rotational motion;
    d) actuators, coupled between adjacent leg segments, to move the leg segments with respect to each other in the walking configuration.

15. A device in accordance with claim 14, wherein the plurality of leg segments further includes a foot pivotally coupled to the lower leg.

16. A device in accordance with claim 14, wherein the plurality of leg segments further includes at least one intermediate leg segment interconnecting the upper and lower legs.

17. A device in accordance with claim 14, further comprising:
    a circular cap, disposable over the leg segments in the wheel configuration.

18. A device in accordance with claim 14, wherein remaining leg segments extend from the upper leg sequentially around an axis in the wheel configuration.

19. A device in accordance with claim 14, wherein at least one of the leg segments extends transversely to one of the other leg segments in the wheel configuration.

* * * * *